W. ATKINS.
DRAFT APPLIANCE.
APPLICATION FILED AUG. 30, 1915.
1,262,733.
Patented Apr. 16, 1918.
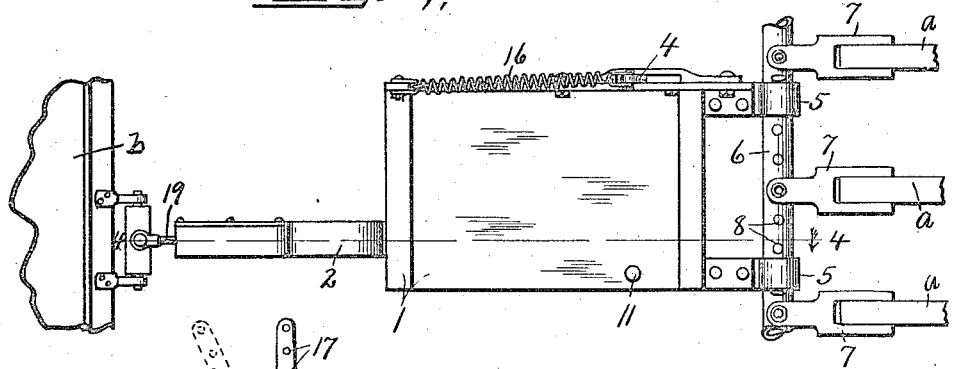
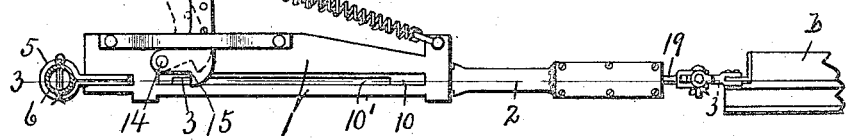
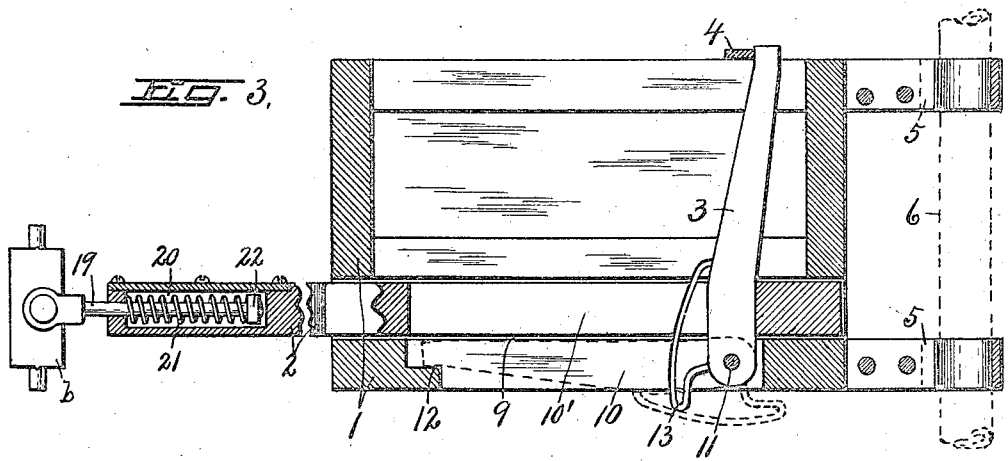
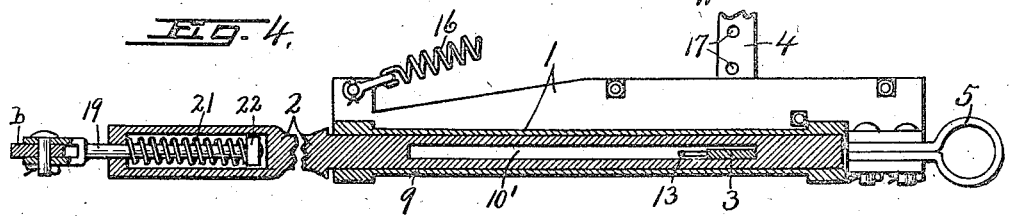
WITNESSES:
INVENTOR
William Atkins
BY Howard P. Denison
ATTORNEY.

UNITED STATES PATENT OFFICE.

WILLIAM ATKINS, OF AUBURN, NEW YORK.

DRAFT APPLIANCE.

1,262,733.

Specification of Letters Patent. Patented Apr. 16, 1918.

Application filed August 30, 1915. Serial No. 47,997.

*To all whom it may concern:*

Be it known that I, WILLIAM ATKINS, a citizen of the United States of America, and resident of Auburn, in the county of Cayuga, in the State of New York, have invented new and useful Improvements in Draft Appliances, of which the following, taken in connection with the accompanying drawings, is a full, clear, and exact description.

This invention relates to certain improvements in draft appliances adapted to be used more particularly in connection with motor tractors for operating gang plows and other farm implements, but it is evident that the same device may be used in the connection between any power and load drawn thereby.

The main object is to provide simple means for automatically releasing the load from the traction power in case such load should exceed a predetermined degree. For example, in plowing with single or gang plows by means of a traction engine, it frequently happens that the point of a plow will suddenly encounter the root of a tree, large stone or other obstacle which may lie in its path, and unless some provision is made for disconnecting the plow from the traction engine, it will result in breakage of either the plow points or some part of the draft device, and the purpose of my invention is to overcome such a contingency.

Other objects and uses relating to specific parts of the device will be brought out in the following description.

In the drawings—

Figure 1 is a top plan of a draft device embodying my automatic uncoupler.

Fig. 2 is a side elevation of the same device.

Fig. 3 is an enlarged horizontal sectional view taken on line 3—3, Fig. 2.

Fig. 4 is an enlarged longitudinal sectional view taken on line 4—4, Fig. 1.

As illustrated, the device comprises coupling sections —1— and —2— constituting a draft device and adapted to be connected, respectively, to a load, as gang plows —a— and suitable draft power as a motor tractor —b—, said sections being normally held in operative relation by a locking member —3— and a suitable keeper —4— arranged in such manner that when the draft sections are subjected to an excessive predetermined strain, tending to pull them apart, the locking member will be automatically tripped from its locking position by one of the draft sections.

The draft section —1— may be termed a draw head consisting, in this instance, of a rectangular frame of suitable material having rearwardly projecting arms —5—, in which is mounted a cross bar —6— to which the plows —a— or other load may be attached by clevises —7—, said cross bar being provided with a series of bolt openings —8— arranged at intervals throughout its length to permit the clevises or other load-attaching means to be adjusted along said bar to different positions so as to centralize as closely as possible the draft of the load relatively to the draft section —2— which may be termed a draw bar.

These sections —1— and —2— are mounted one upon the other for relative movement parallel with the line of draft, the section —1— being provided with a lengthwise guide opening —9— extending from end to end of the main body thereof, and preferably of longitudinal cross section, for receiving and guiding the draft bar —2— which is of substantially the same cross sectional form and size as the guide opening —9— and when adjusted for use extends practically the entire length of said guide opening and some distance forwardly beyond the front end of the section —1—.

The section —1— is of considerably greater width than the section —2— to properly support the locking member —3— and keeper —4— and permit said locking member and keeper to be properly constructed and adjusted with relation to each other and to the draw bar —2—, the guide opening —9— being located nearer to one edge of the section —1— than to its opposite edge so as to bring the points of connection between the draw bar and locking member as closely as possible to the fulcrum of the locking member in order that the resistance to the strains tending to separate the draft sections may be increased to the desired degree.

The draft sections —1— and —2— are provided with longitudinally elongated transverse slots —10— registering with each other and with the guide opening —9— to receive and permit the desired play of the locking member —3— which consists of a lever pivoted or fulcrumed at —11— to the section —1— at one side of the guide opening —9— near the rear end of the slot —10—, the front end of the same side of the section —1— being provided with a limiting stop —12— adapted to be engaged by the free end of the locking lever —3— to limit its lateral swinging movement to its released position.

The pivot or fulcrum —11— and stop shoulder are, therefore, located at one and the same side of the lengthwise guide opening —9— a sufficient distance to allow the locking lever to swing out of the path of movement of the draft section —2— when in its released position, said lever being provided with a suitable handle —13— by which it may be returned to its locking position.

The locking lever —3— is of sufficient length to extend entirely across the section —1— and slightly beyond the edge thereof opposite that to which the locking lever is pivoted for interlocking engagement with the keeper —4—, it being understood that when the locking lever —3— is in its locking position, it extends through the slot as —10'— in the draw bar —2— and is engaged with the rear end of said draw bar to hold the latter in operative relation to the draw head —1—.

The keeper —4— preferably consists of an upright lever having its lower end pivoted or fulcrumed at —14— to the side of the draw head —1— opposite that to which the locking lever —3— is fulcrumed so as to swing on an axis at right angles to that of said locking lever and is also provided with a pendent shoulder or catch —15— for interlocking engagement with the free end of the locking lever —3— said catch or shoulder being located in a plane below and at the front of the fulcrum or pivot —14— to oppose with a predetermined resistance the tendency of the draft sections to separate.

This keeper is, therefore, movable in the direction of the line of draft and is yieldingly held in operative position in locking engagement with the free end of the locking lever —3— by coil spring —16— having one end attached to the keeper —4— some distance above its fulcrum and its other end extended forwardly and attached to a suitable anchorage on the draw head —1—, thus adding additional resistance to the release of the keeper and locking lever in holding the draft sections in operative relation under draft strains tending to separate said sections.

The degree of this resistance may be varied at will by attaching the spring —16— to points of the keeper lever —4— at different distances from its fulcrum, and for this purpose, I have provided said keeper with a series of apertures —17— for receiving the connecting bolt as —18— by which the spring is connected to said keeper.

The front end of the draw bar —2— is provided with a relatively movable jaw bolt —19—having its front end provided with means for attachment to the tractor —b— and its other end extended into a chamber —20— in the main body of the draw bar and encircled by a coil spring —21— interposed between the front end of the main body —2— and a shoulder —22— on the rear end of the bolt —19— to serve as a shock absorber for preventing sudden strains upon the coupling sections or load attached thereto.

It is now evident that by establishing the point of connection between the draw bar —2— and locking lever —3— a relatively short distance from the fulcrum of said lever and by engaging the keeper —4— with the free end of said lever at a considerably greater distance from the fulcrum and near the fulcrum of the keeper —4—, a comparatively slight resistance, as by the spring —16— applied to the keeper lever —4— some distance from the fulcrum opposite the point of engagement of the keeper with the locking lever, would hold the coupling sections in operative relation against a considerably greater force tending to separate said sections.

In other words, a few pounds resistance applied to the upper end of the keeper —4— would hold the draft sections in operative connection against a force of several thousand pounds, tending to separate them, this resistance being increased as the spring —16— is adjusted toward the upper end of the keeper and is reduced by a reverse adjustment so that the operator may gage the resistance by adjustment of the spring to conform to the requirements of safety in the operation of different devices which may be drawn by the coupling.

For example, in operating gang plows, the spring would be adjusted farther up on the keeper —4— than would be necessary in the operation of harrows or other more delicate implements, but in each case the spring would be adjusted to a predetermined degree according to the strength of the implement operated, making the adjustment so as to prevent breakage of such implement in case it should suddenly encounter any obstacle which might interfere with its free movement by the draft device.

What I claim is:

In a draft appliance of the character described, the combination of a draw-head having a transverse slot and a lengthwise guide-way, a draw-bar slidable endwise in said guide-way and thereby held against relative lateral movement, said draw-bar having a lengthwise slot registering with the transverse slot in the draw-head and provided with a draft shoulder at the rear end of its slot, a locking lever pivoted to the draw-head at one side of the draw-bar and extending through both of the slots for engagement by said shoulder, said slots being of greater length than the locking lever to allow the latter to swing from a crosswise locking position to a lengthwise releasing position, and means for holding the lever in its locking position when the load is below a certain degree and for releasing the lever when the load exceeds said degree.

In witness whereof I have hereunto set my hand this 19th day of August, 1915.

WILLIAM ATKINS.

Witnesses:
H. E. CHASE,
ALICE M. CANNON.

Copies of this patent may be obtained for five cents each, by addressing the "Commissioner of Patents, Washington, D. C."